Figure 21:
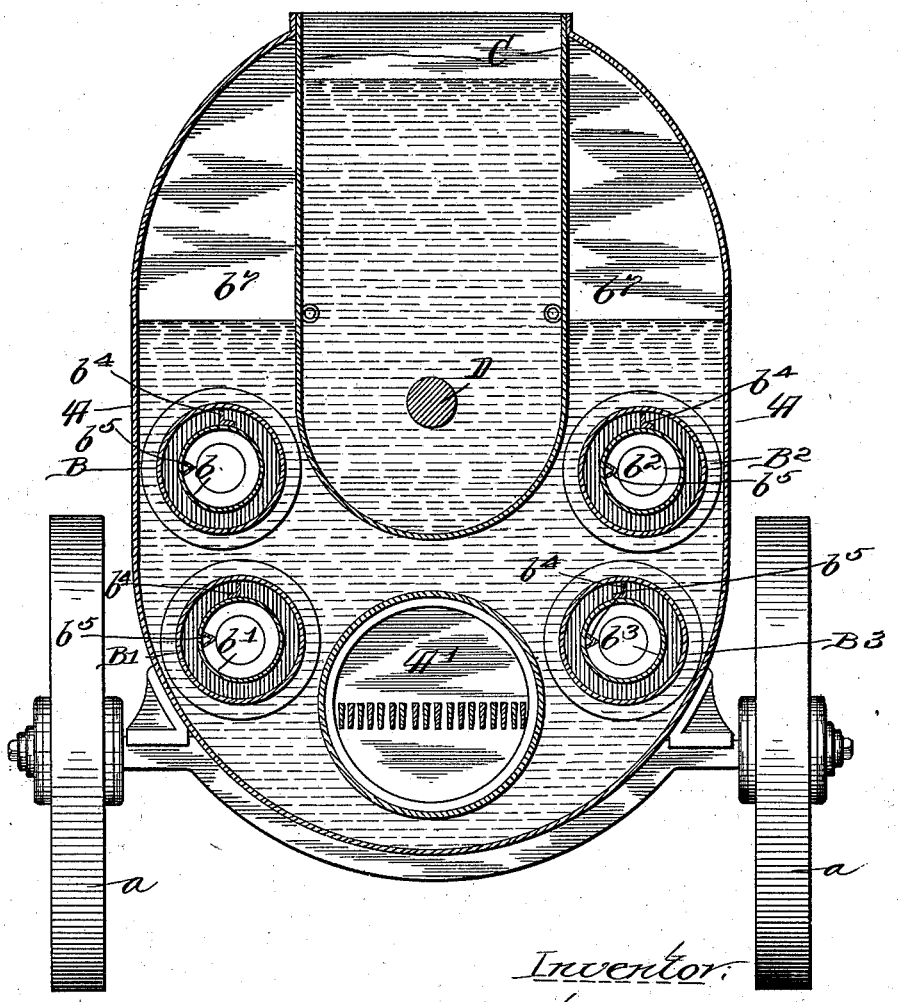

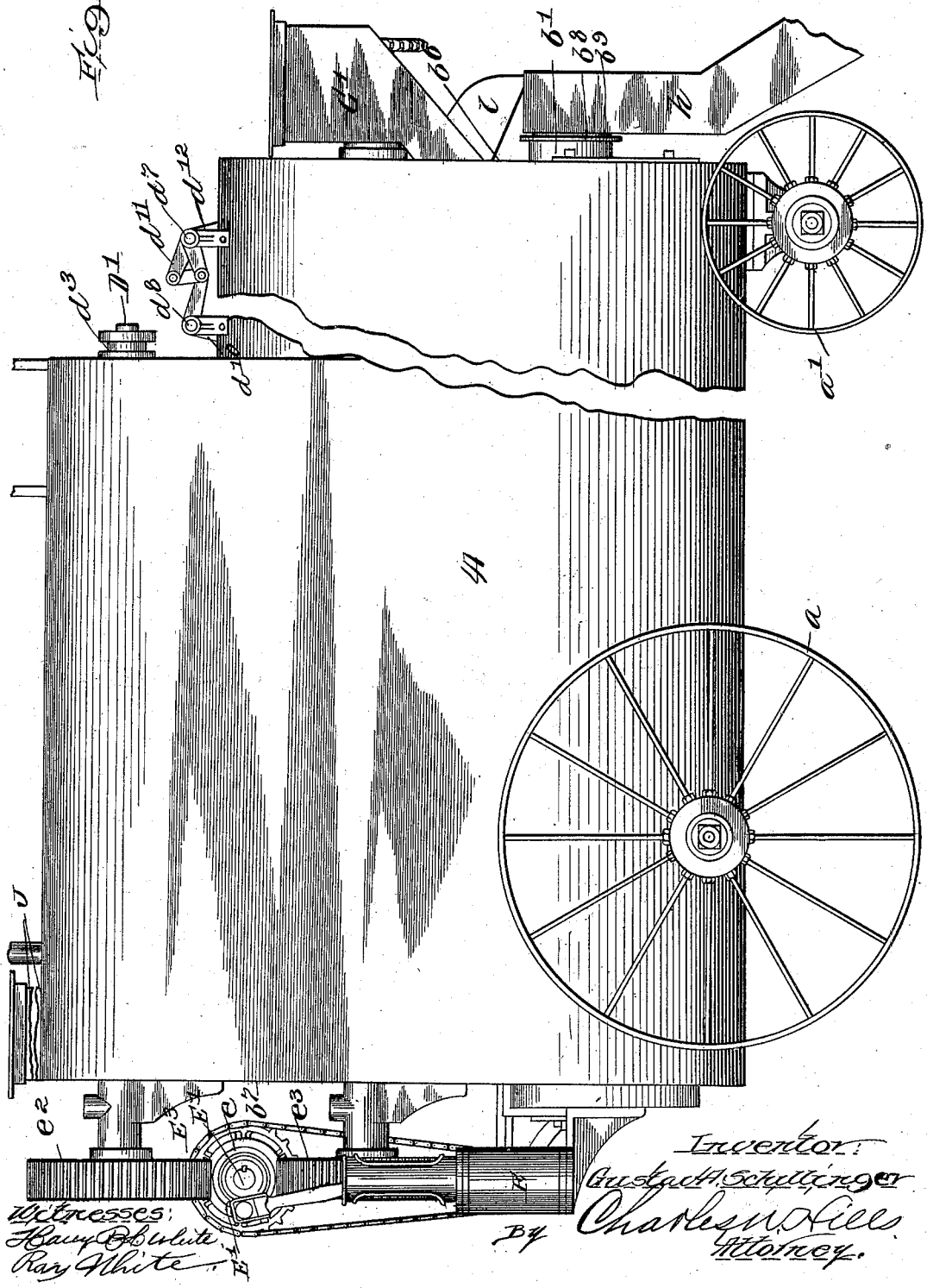

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 2.
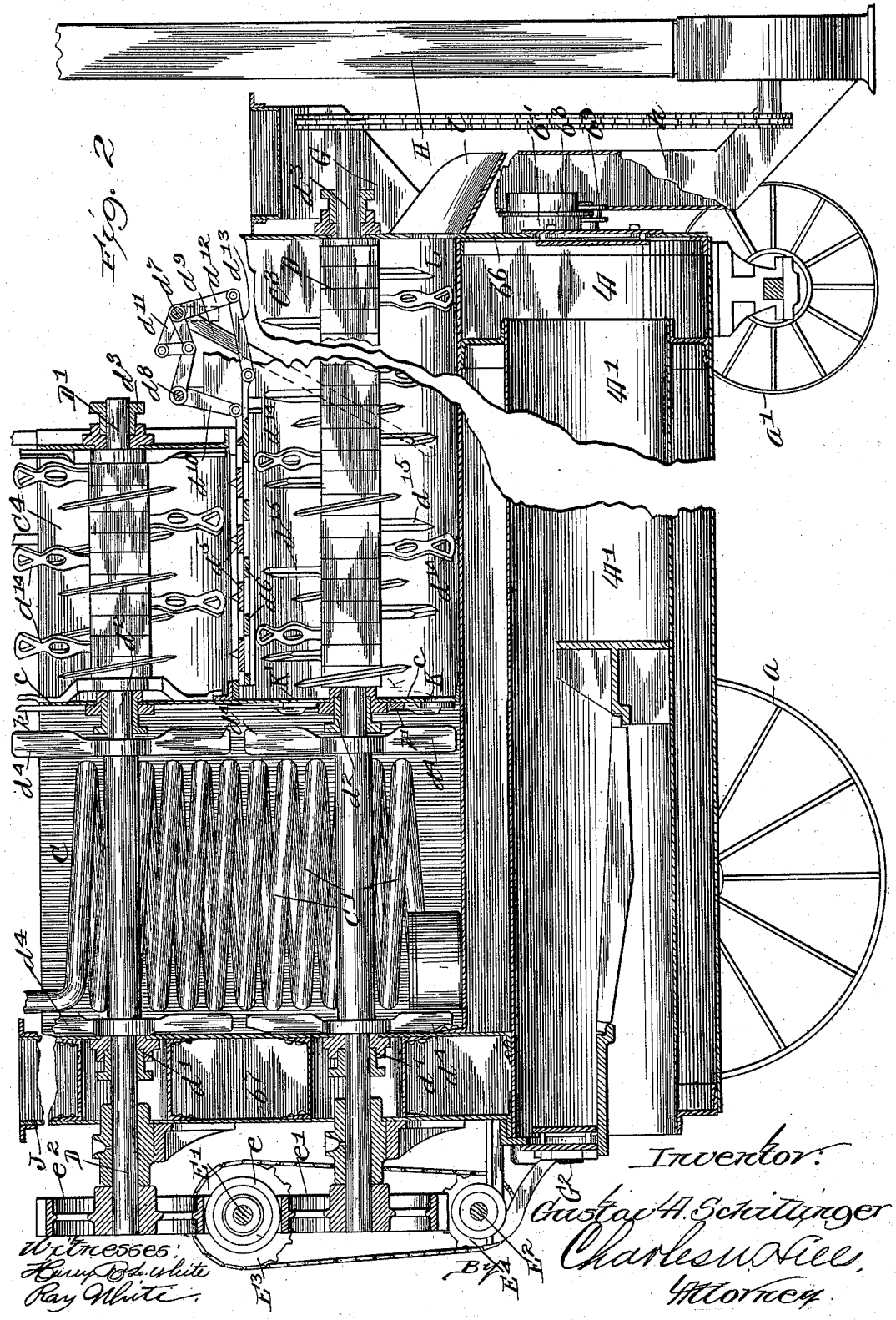

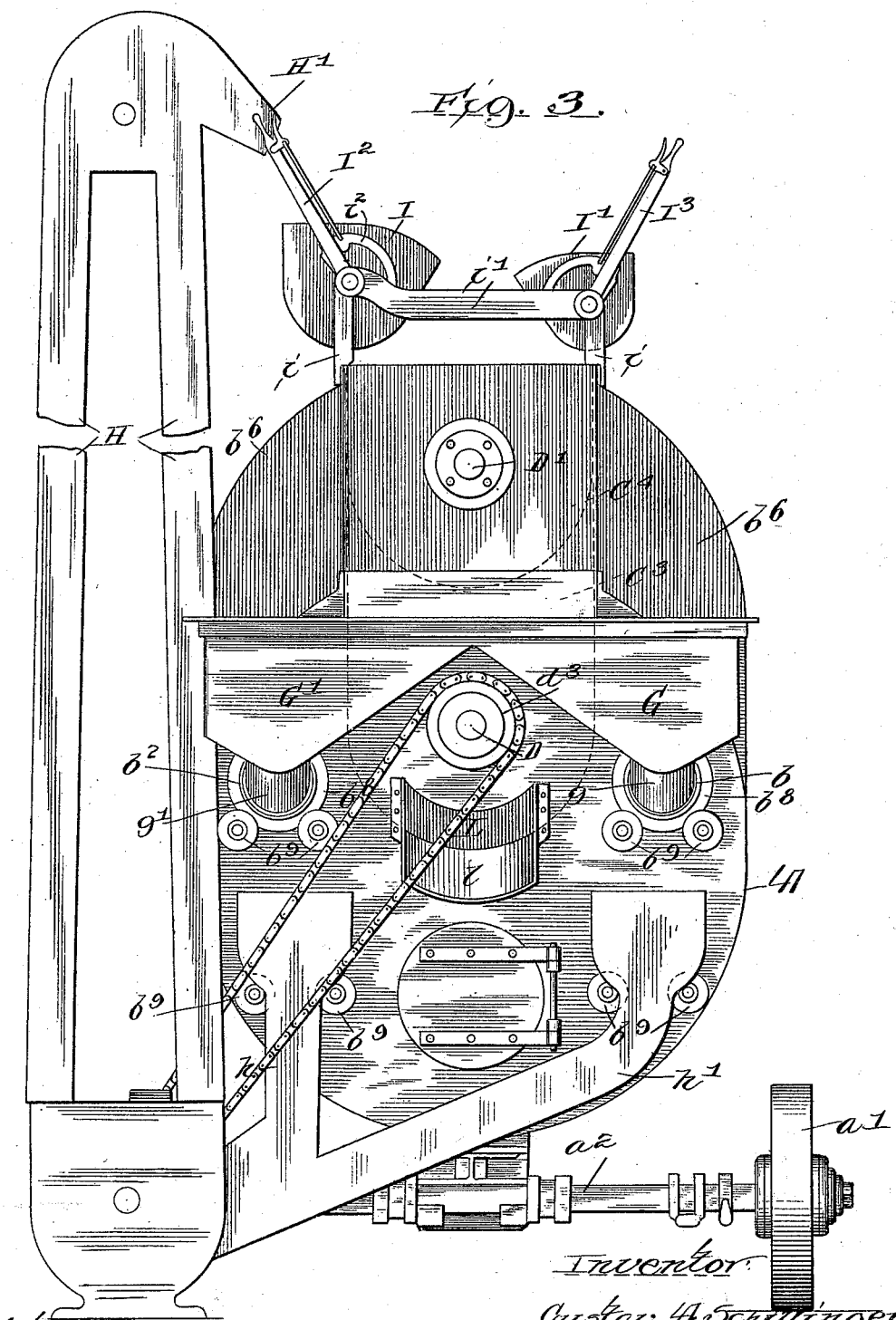

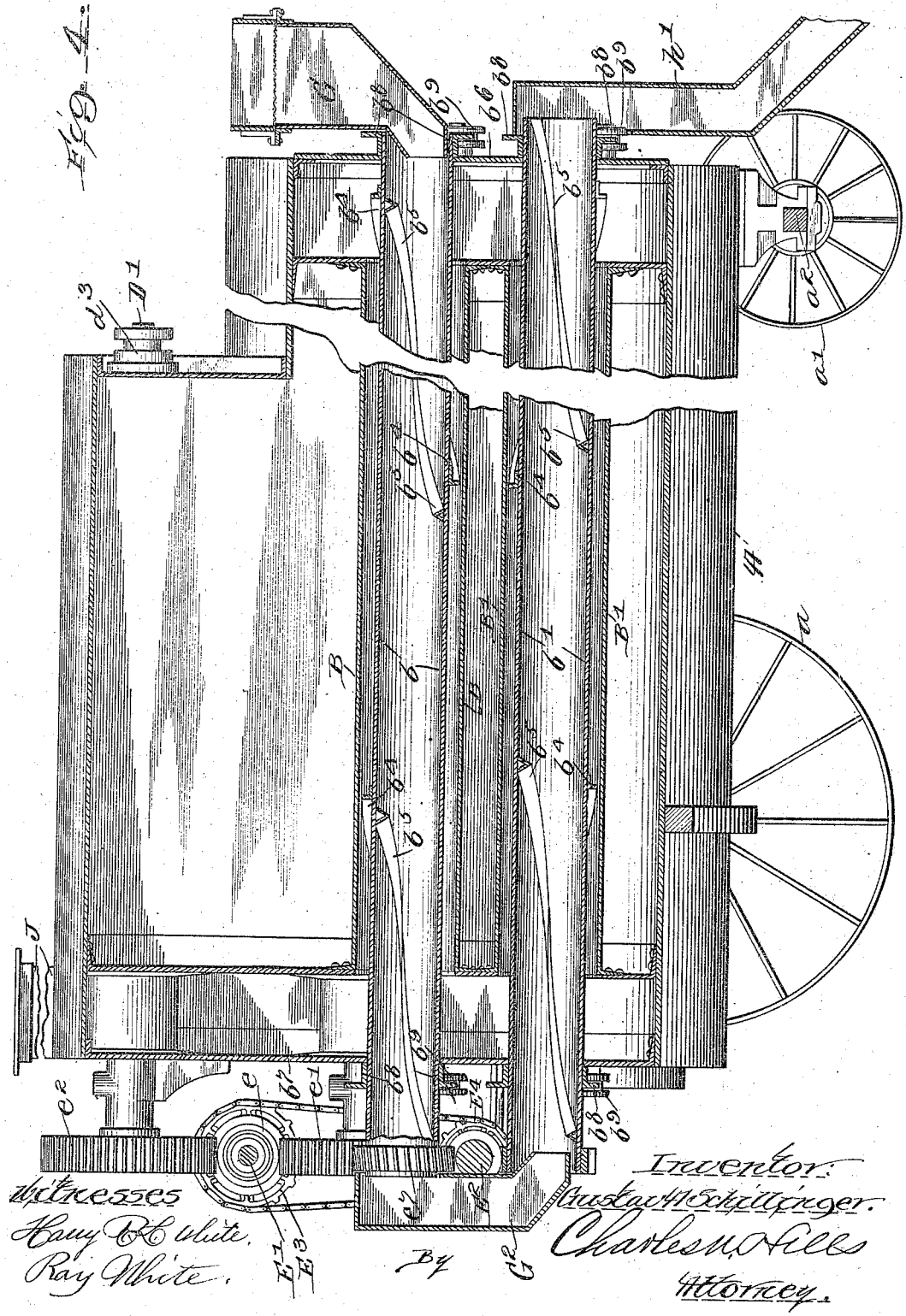

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 5.
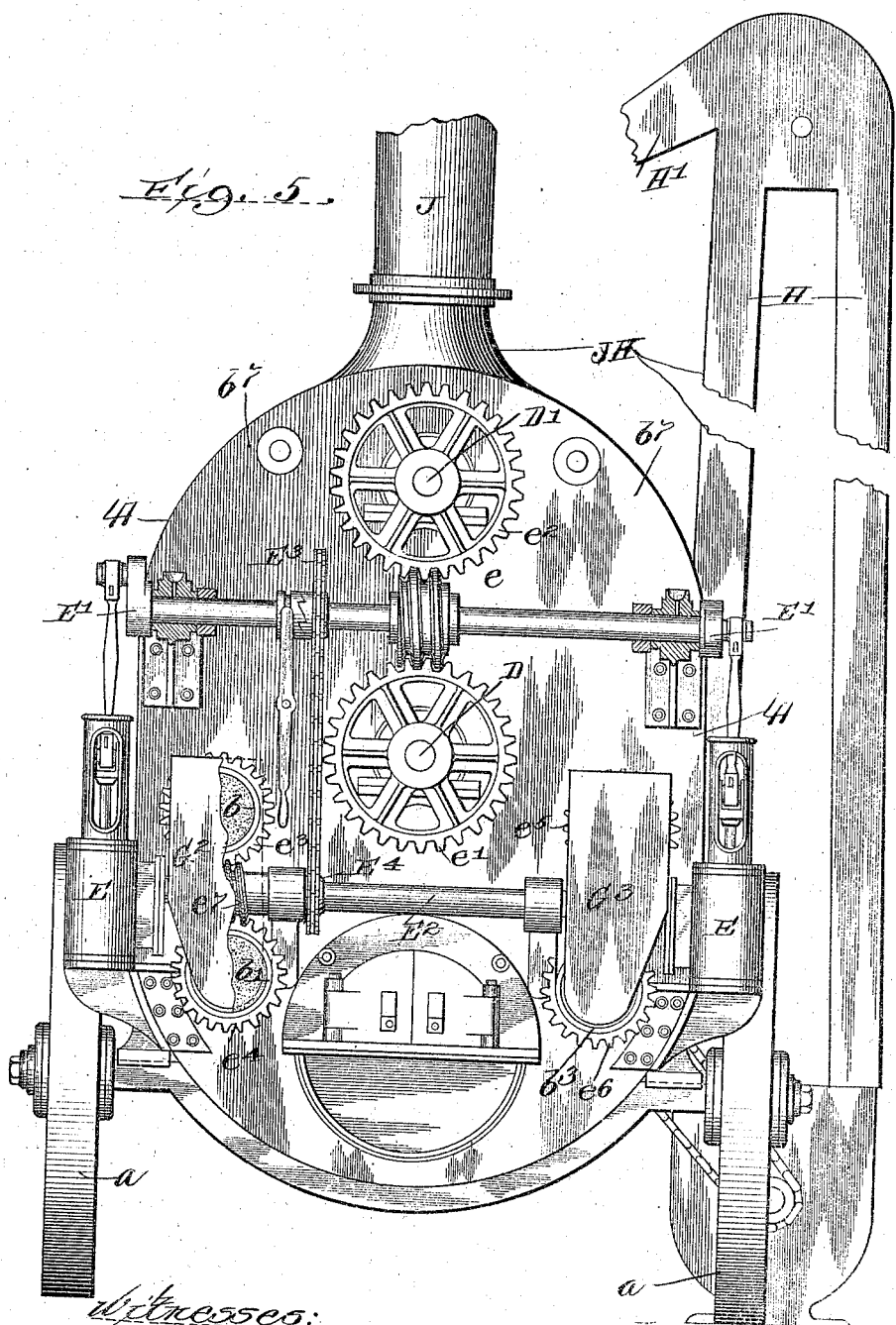

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 6.
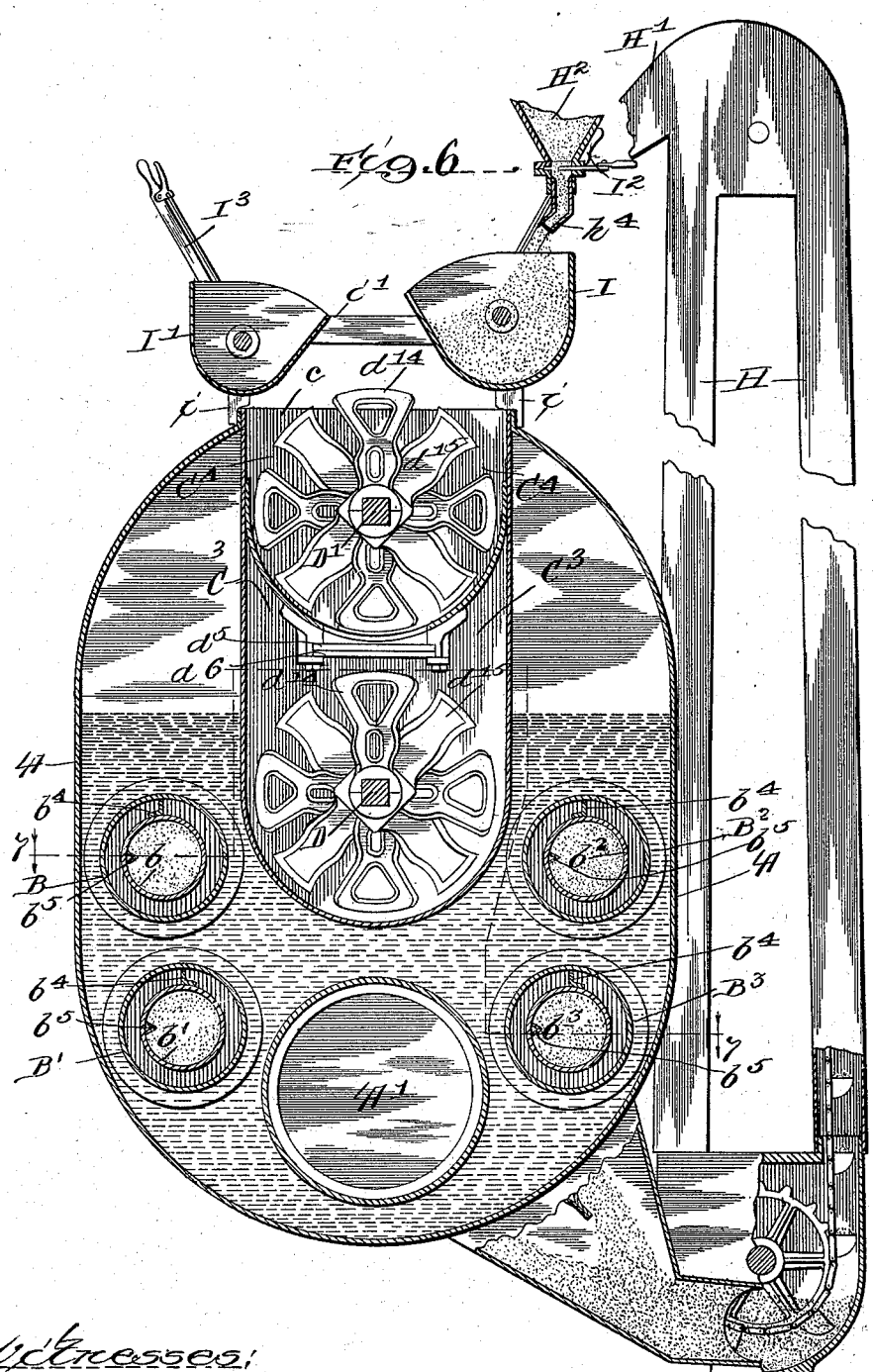

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 7.
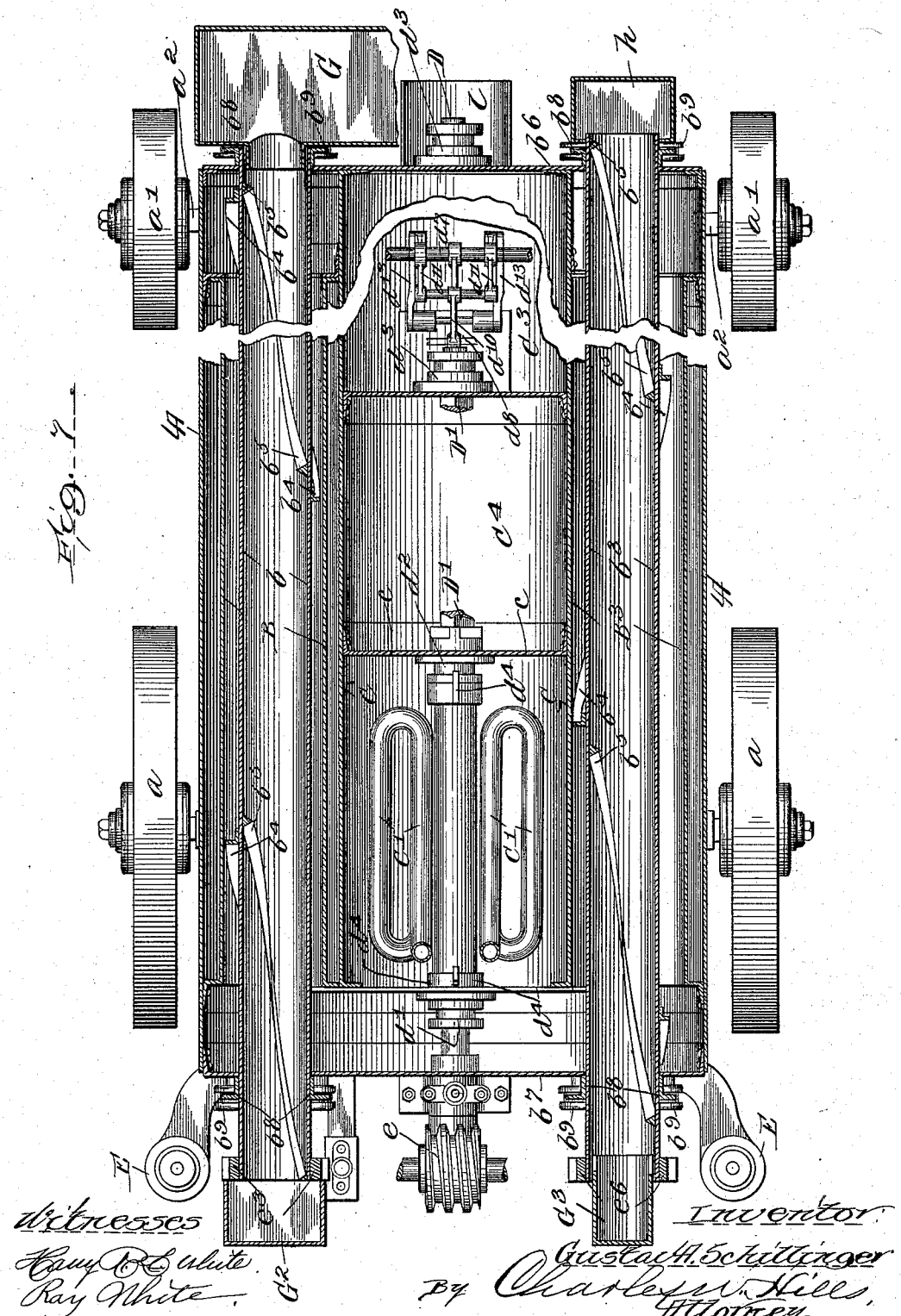

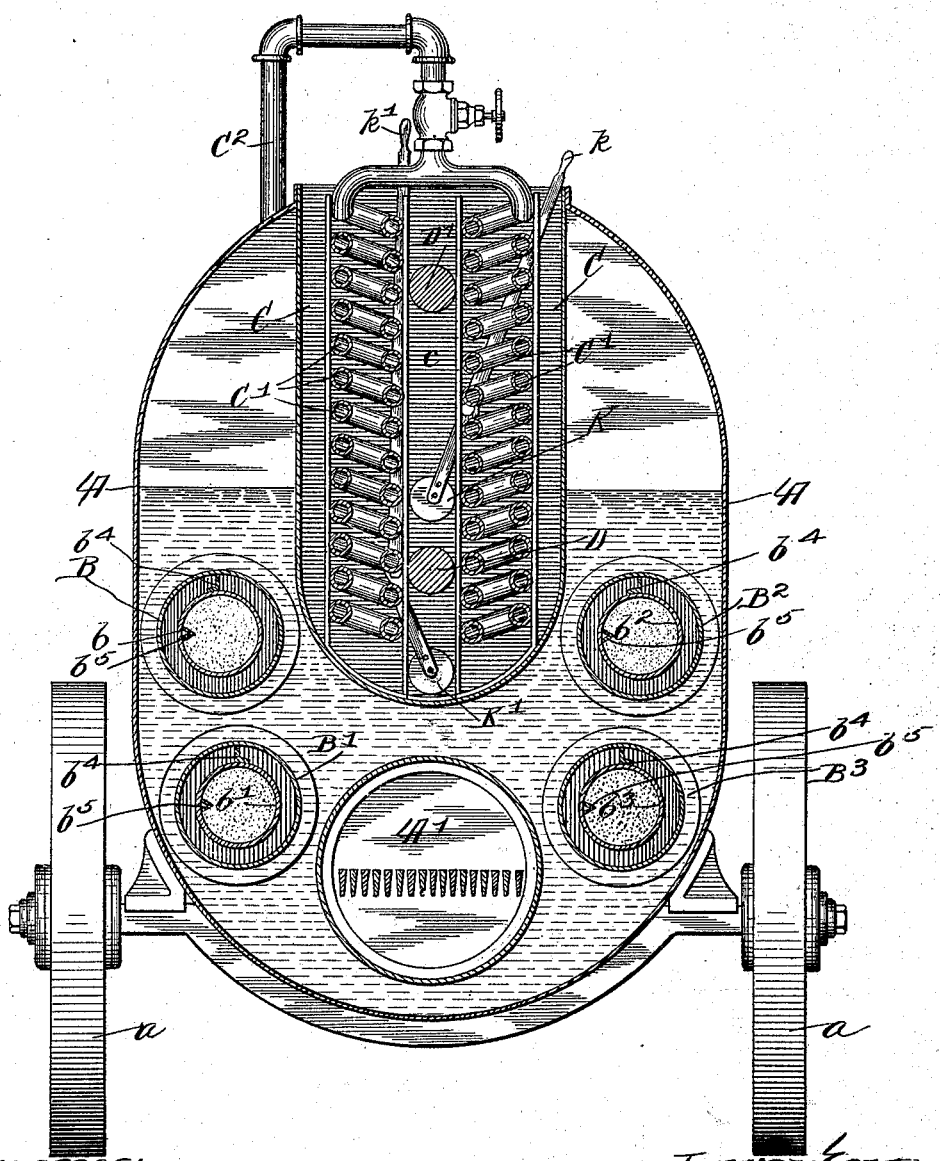

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 9.
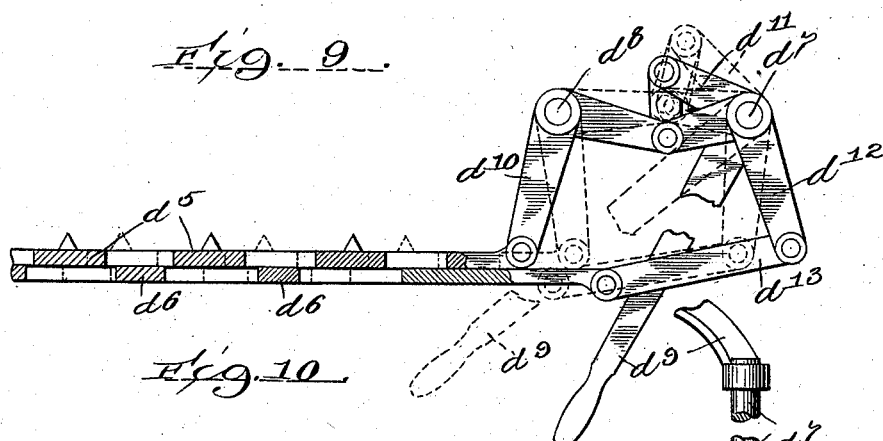
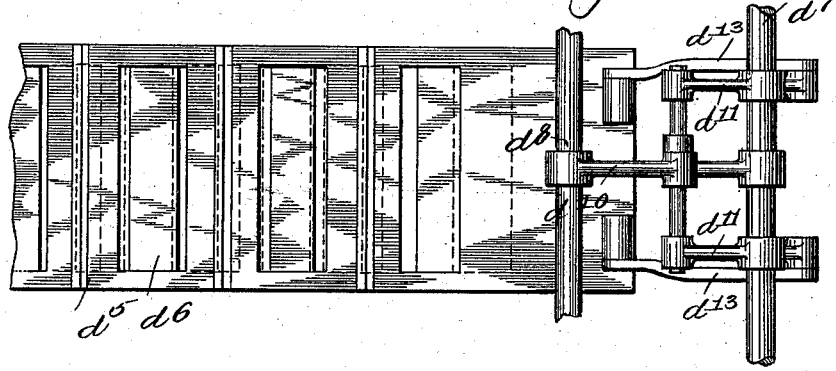
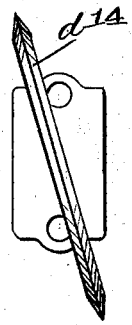
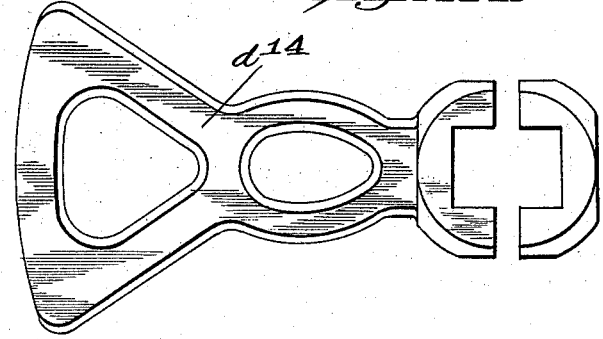

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 10.
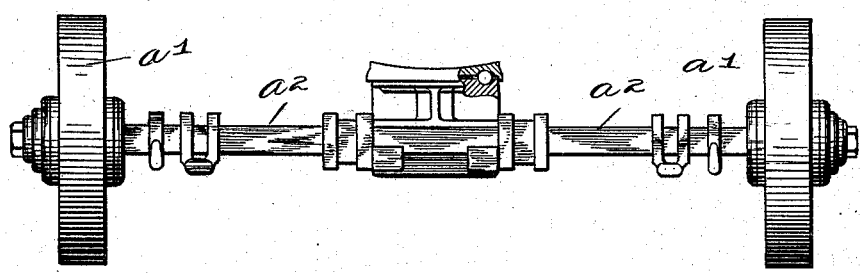
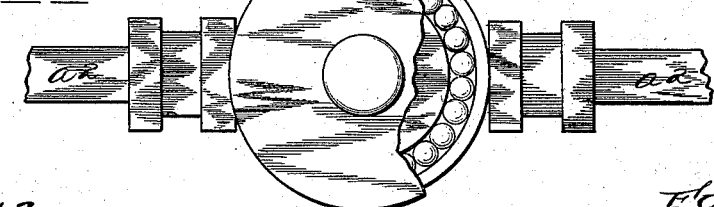
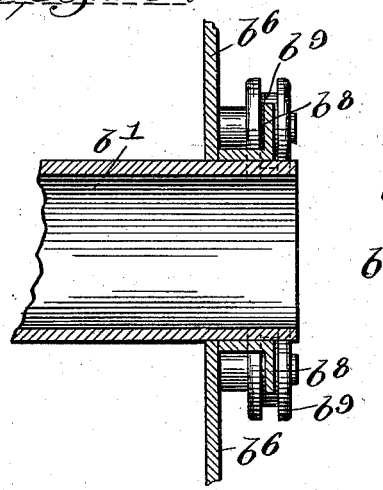
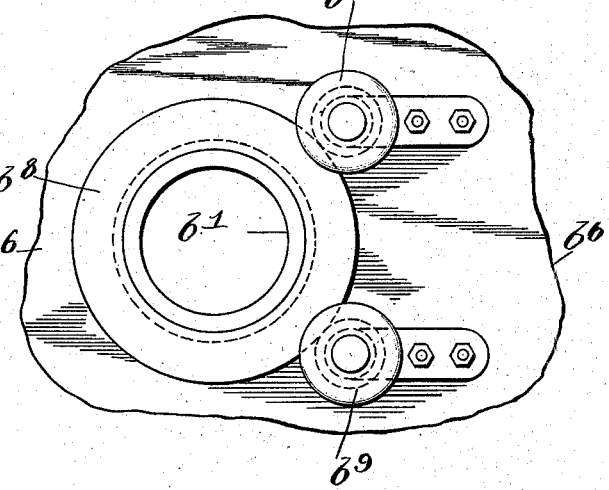

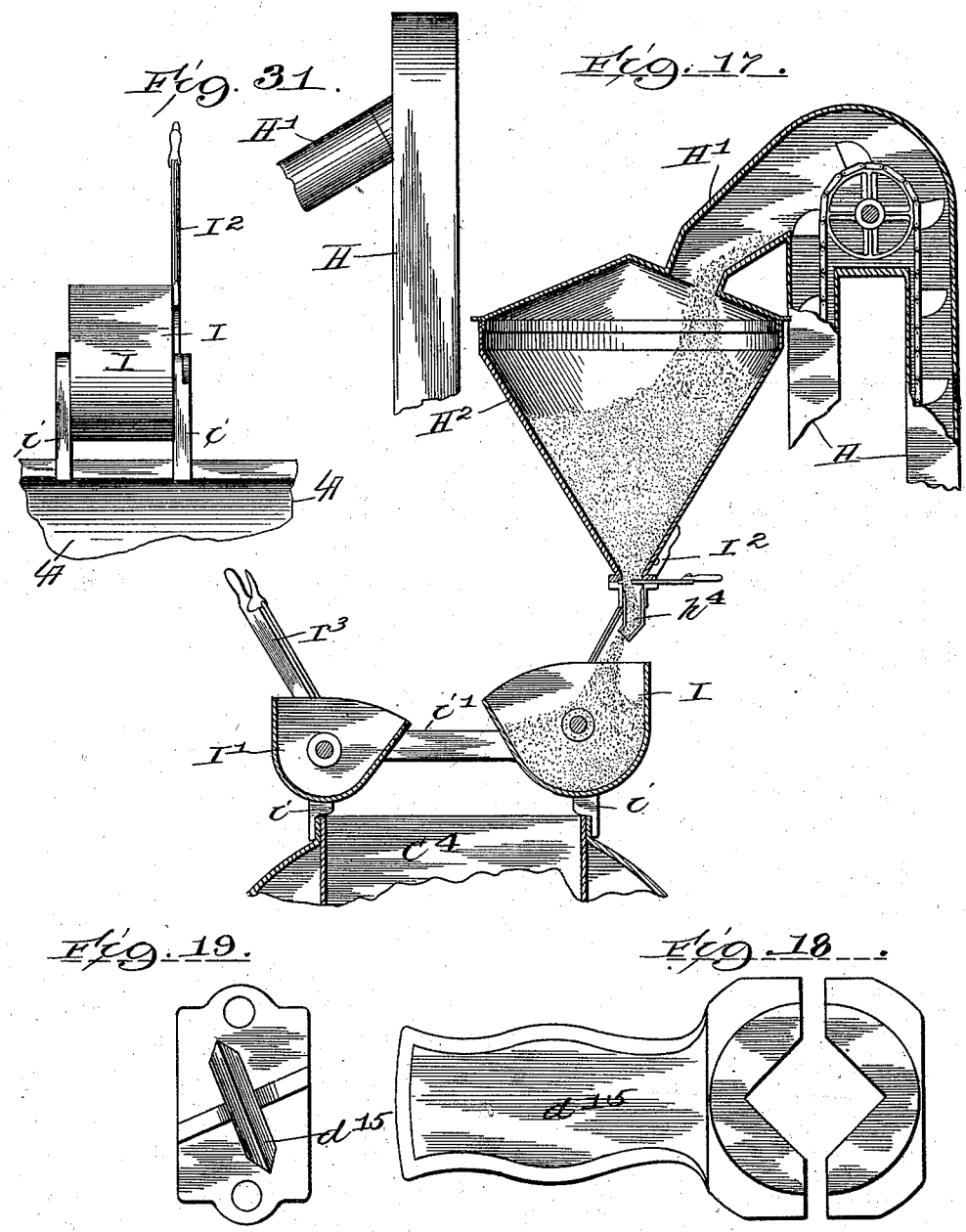

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 12.
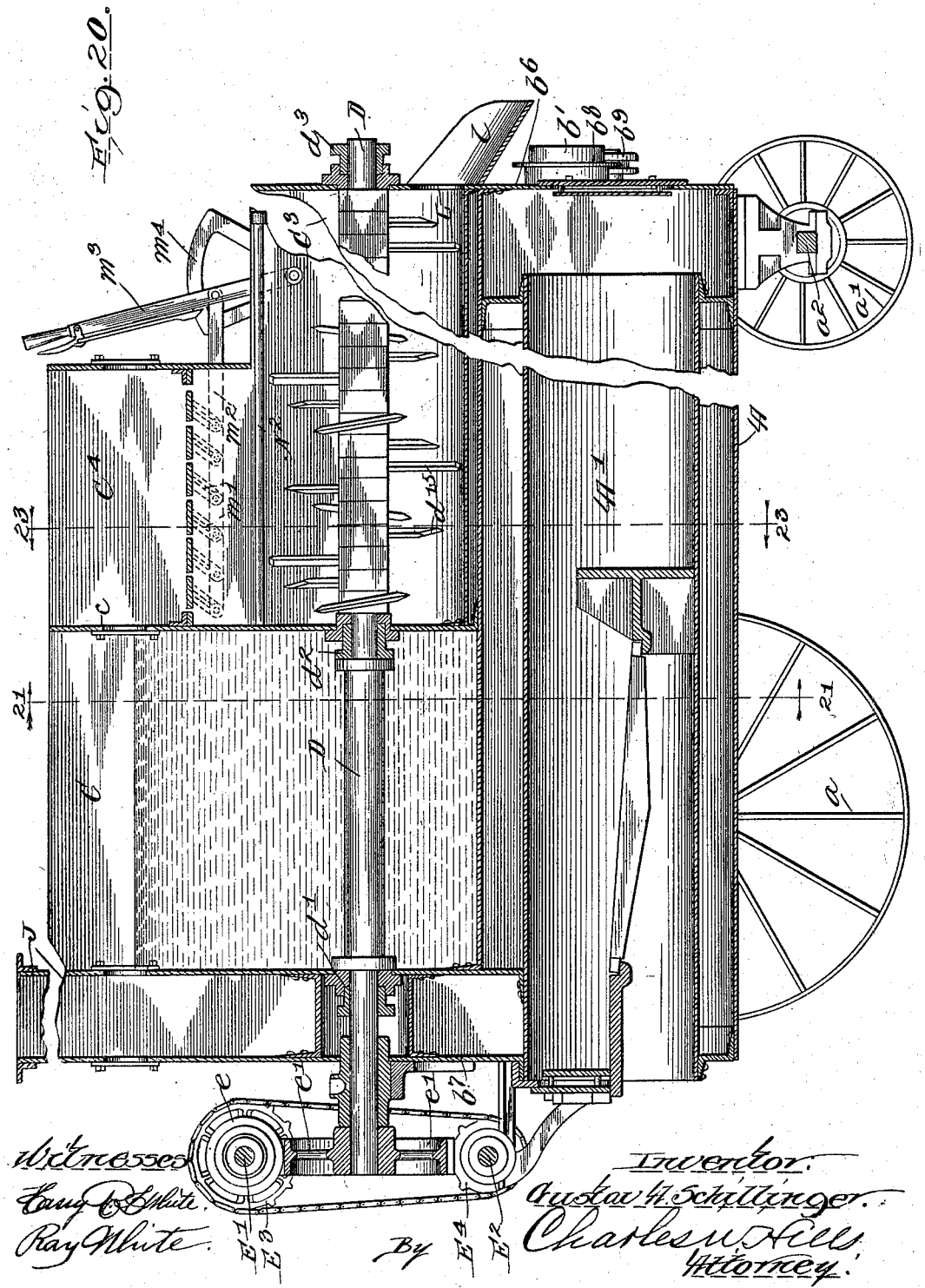

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 13.

Witnesses
Harry R. White
Ray White

Inventor
Gustav A. Schillinger
By Charles W. Hills
Attorney

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 15.

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 16.

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 17.
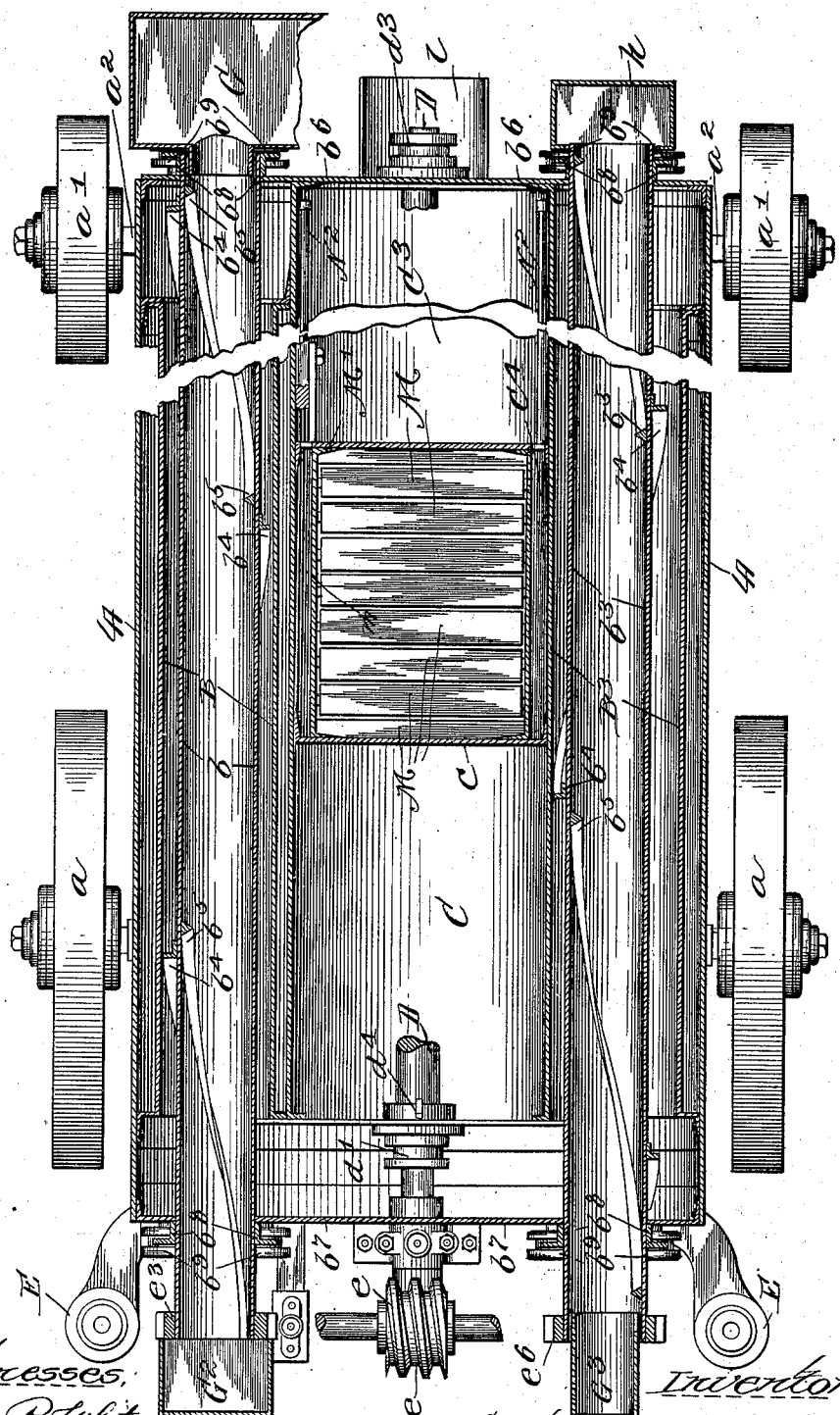

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 18.
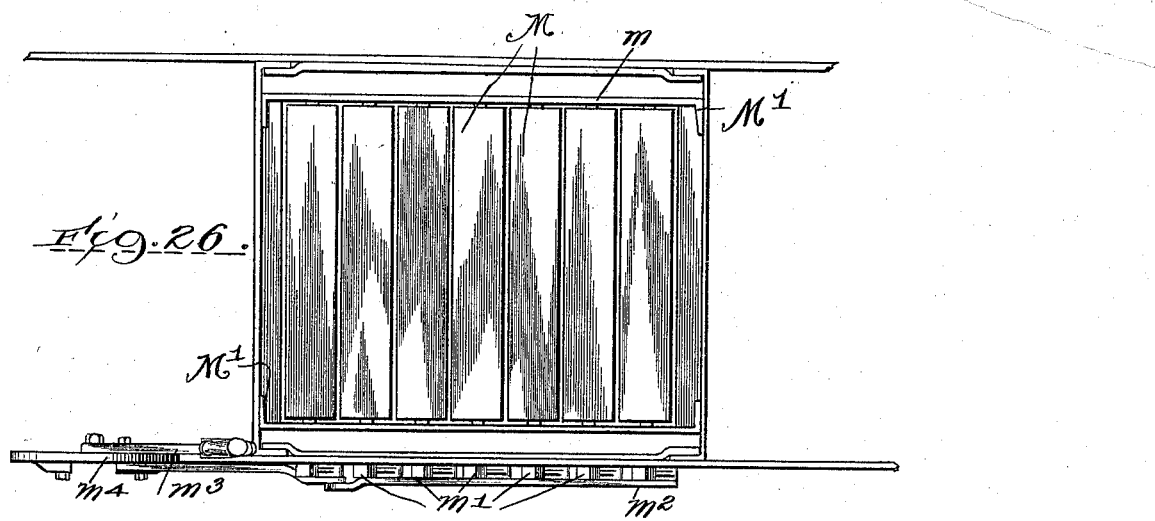
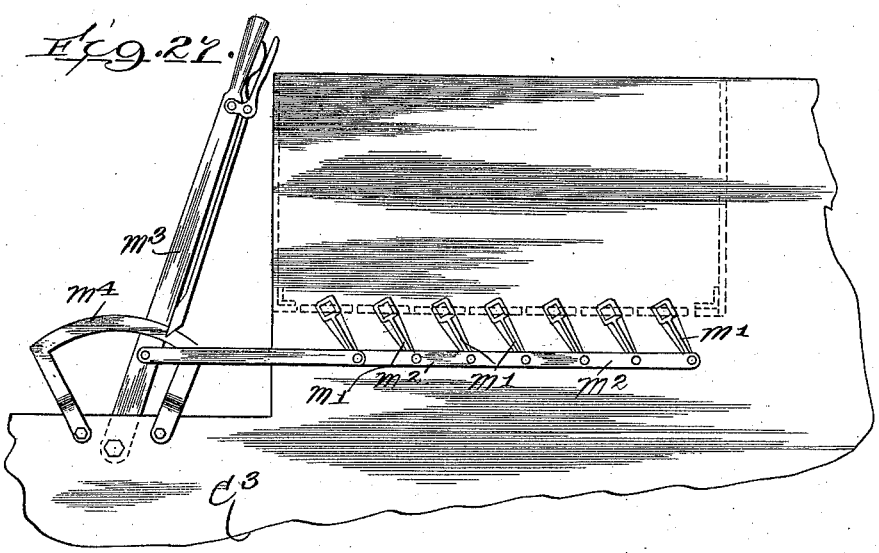

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 19.
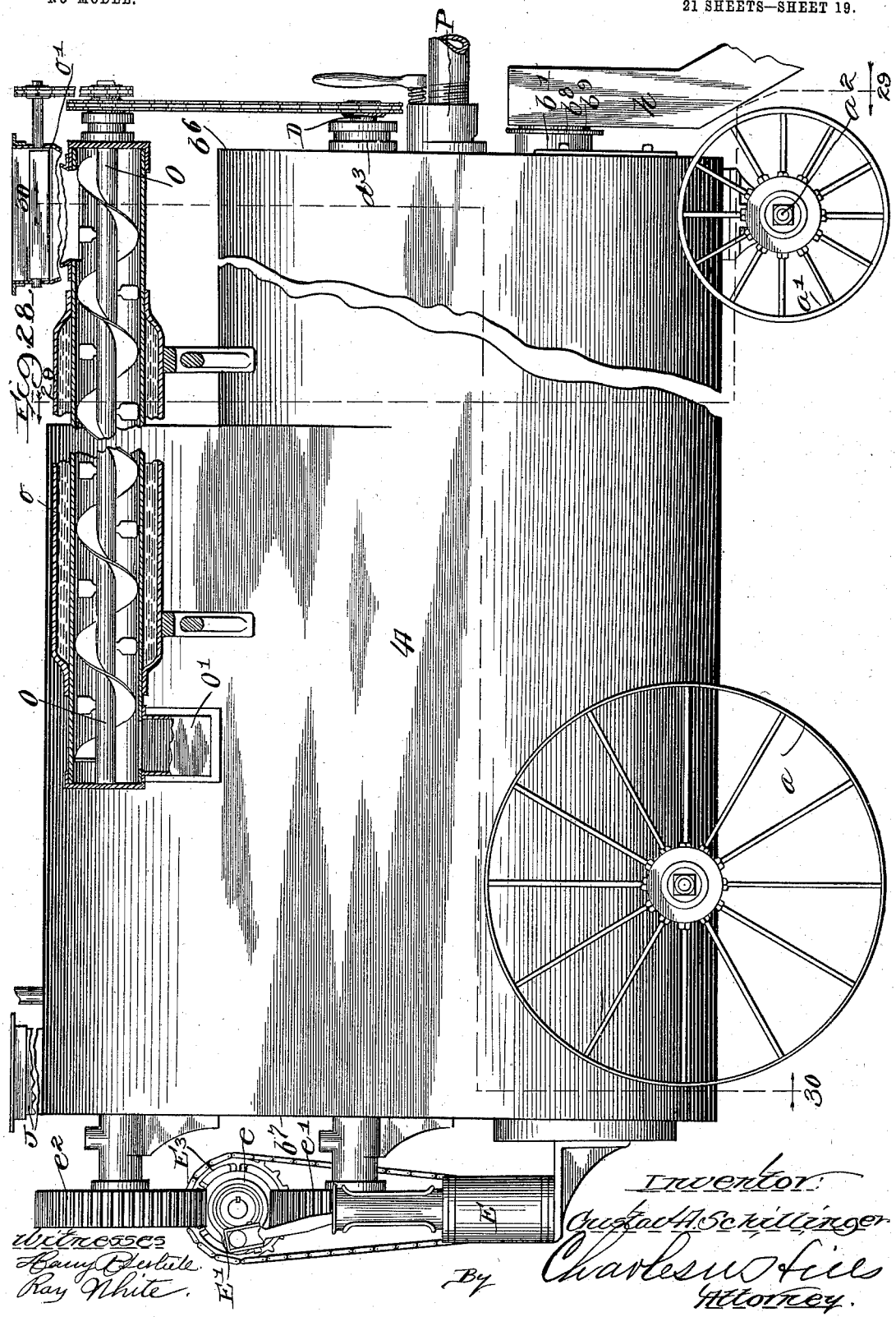

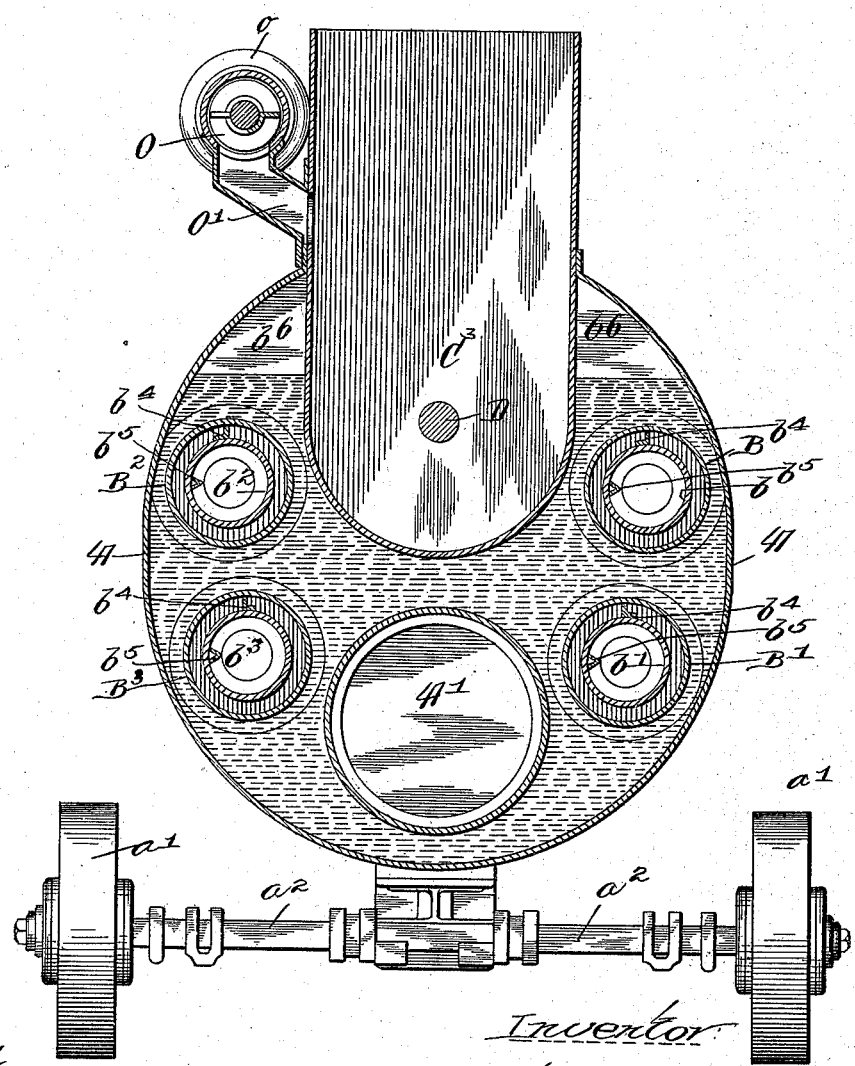

No. 747,652. PATENTED DEC. 22, 1903.
G. A. SCHILLINGER.
INTERCHANGEABLE ASPHALT, CONCRETE, AND MASTIC MIXER.
APPLICATION FILED JULY 20, 1901.
NO MODEL. 21 SHEETS—SHEET 21.
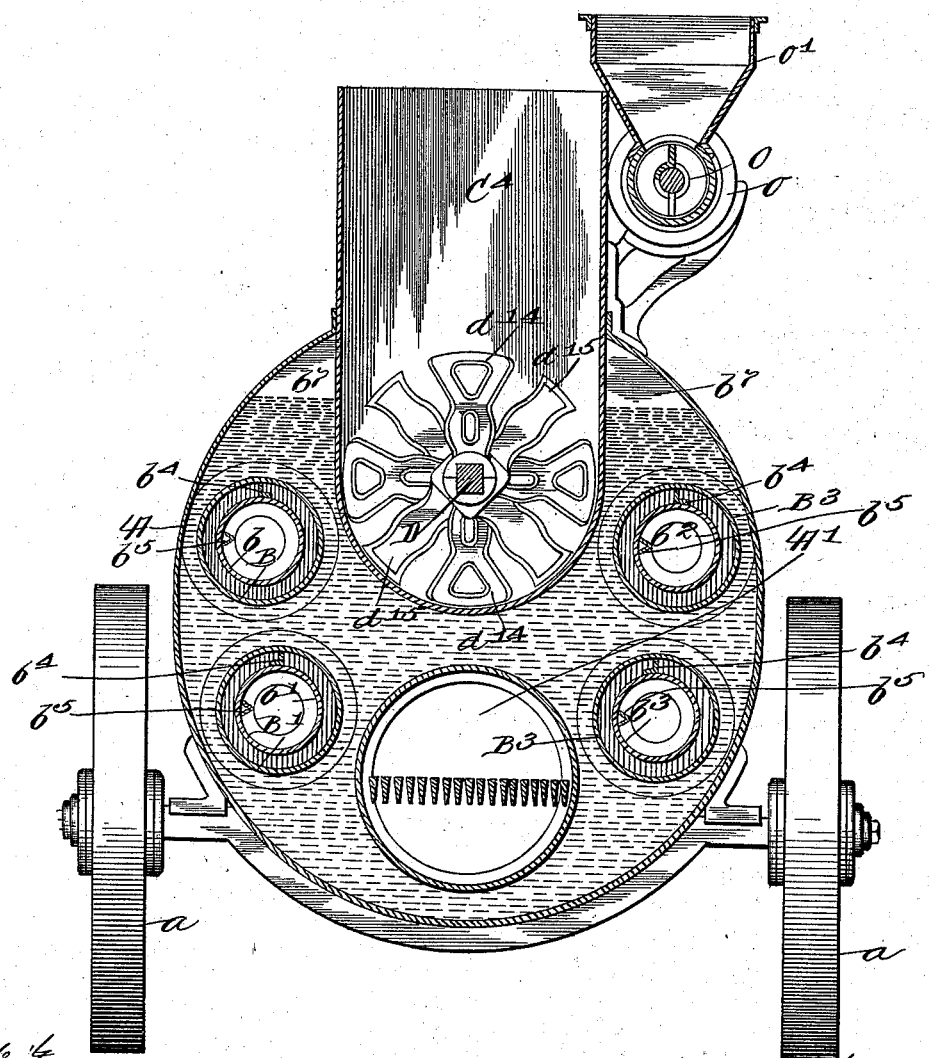

No. 747,652. Patented December 22, 1903.

UNITED STATES PATENT OFFICE.

GUSTAV A. SCHILLINGER, OF CHICAGO, ILLINOIS.

INTERCHANGEABLE ASPHALT, CONCRETE, AND MASTIC MIXER.

SPECIFICATION forming part of Letters Patent No. 747,652, dated December 22, 1903.

Application filed July 20, 1901. Serial No. 69,166. (No model.)

*To all whom it may concern:*

Be it known that I, GUSTAV A. SCHILLINGER, a citizen of the United States, and a resident of Chicago, in the county of Cook and State of Illinois, have invented certain new and useful Improvements in Interchangeable Asphalt, Concrete, and Mastic Mixers; and I do hereby declare that the following is a full, clear, and exact description thereof, reference being had to the accompanying drawings and to the letters of reference marked thereon.

The invention relates more particularly to a portable power mixing and heating device of the described class adapted to be quickly and readily adjusted for any of said purposes and designed to receive the materials and heat the same when desirable, mix them, and deliver from the machine ready for use. Heretofore it has been common to prepare such material at a stationary plant and to cart the same to the point where the same is to be used. This is objectionable, inasmuch as the material being mixed in large batches the quality of one load often differs from the next delivered, thereby causing a difference in the wearing qualities of adjacent parts of the work. The same result may arise from the unequal cooling of different loads, while a shower of rain may necessitate the return of several loads to the plant to be worked over.

The object of my invention is to provide a device adapted to be located at the point of using the material, of simple construction, readily convertible from one type of machine to the other, having self-contained means for heating and agitating the ingredients and mixing the same thoroughly together in the proper proportions, and delivering the same for use by means of power generated within itself.

The invention consists of the matters hereinafter described, and more fully pointed out and defined in the appended claims.

Figure 22:
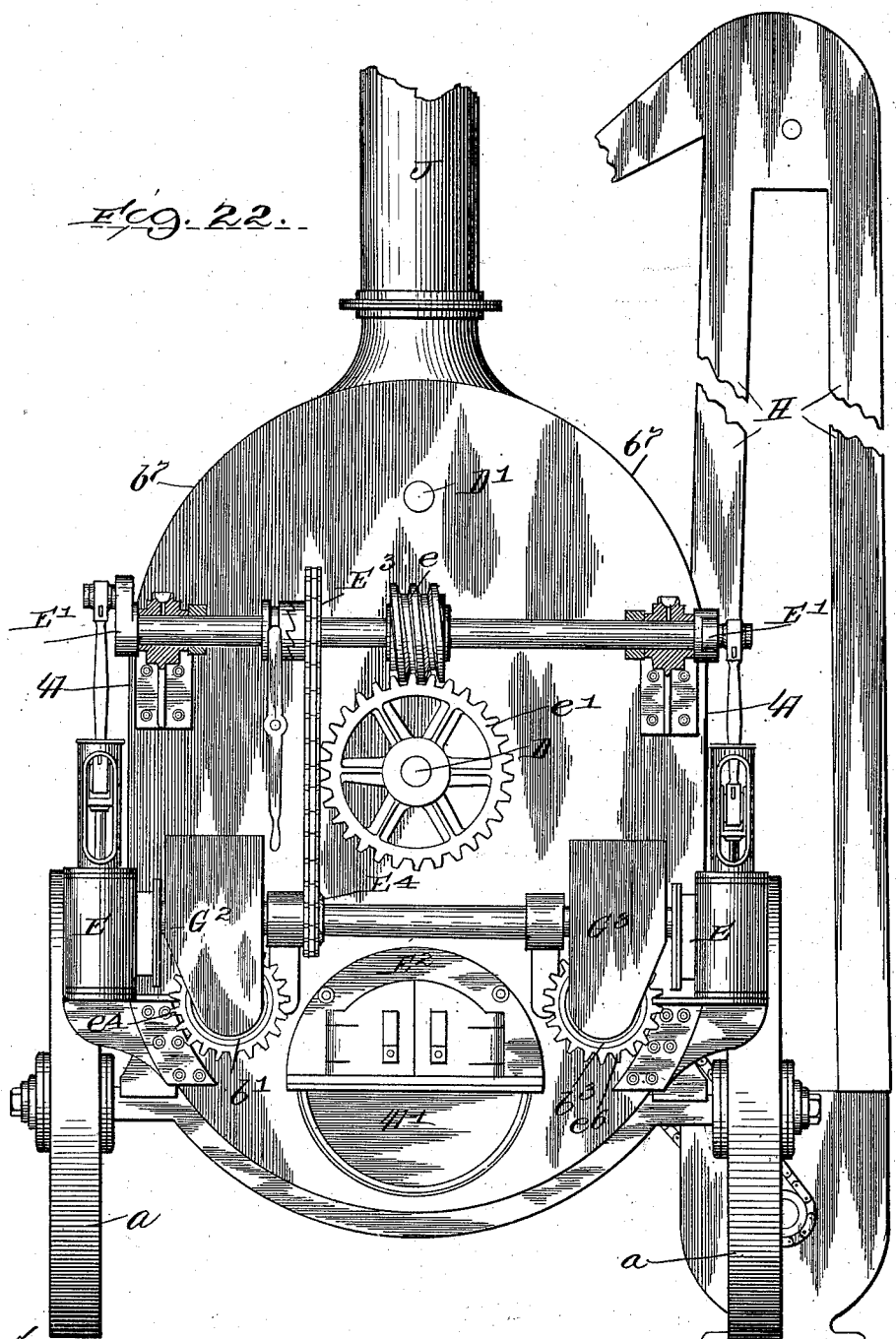
Figure 23:
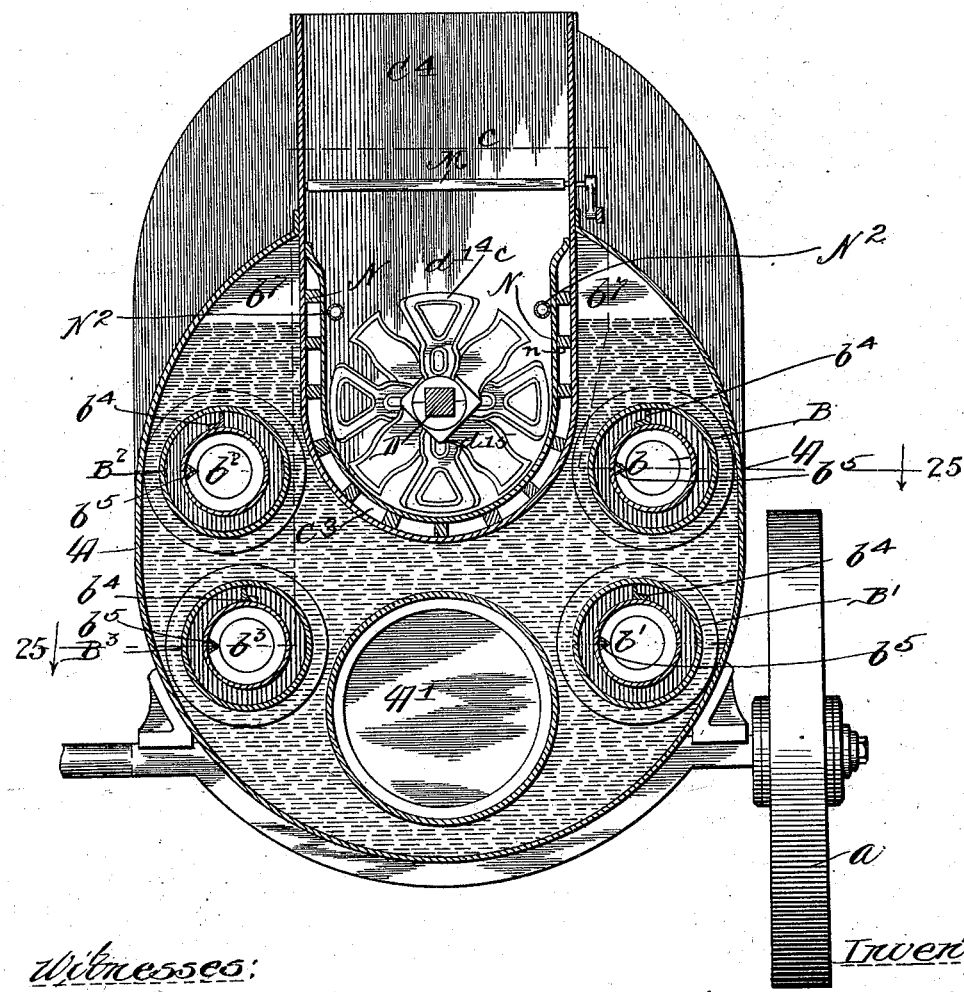
Figure 24:
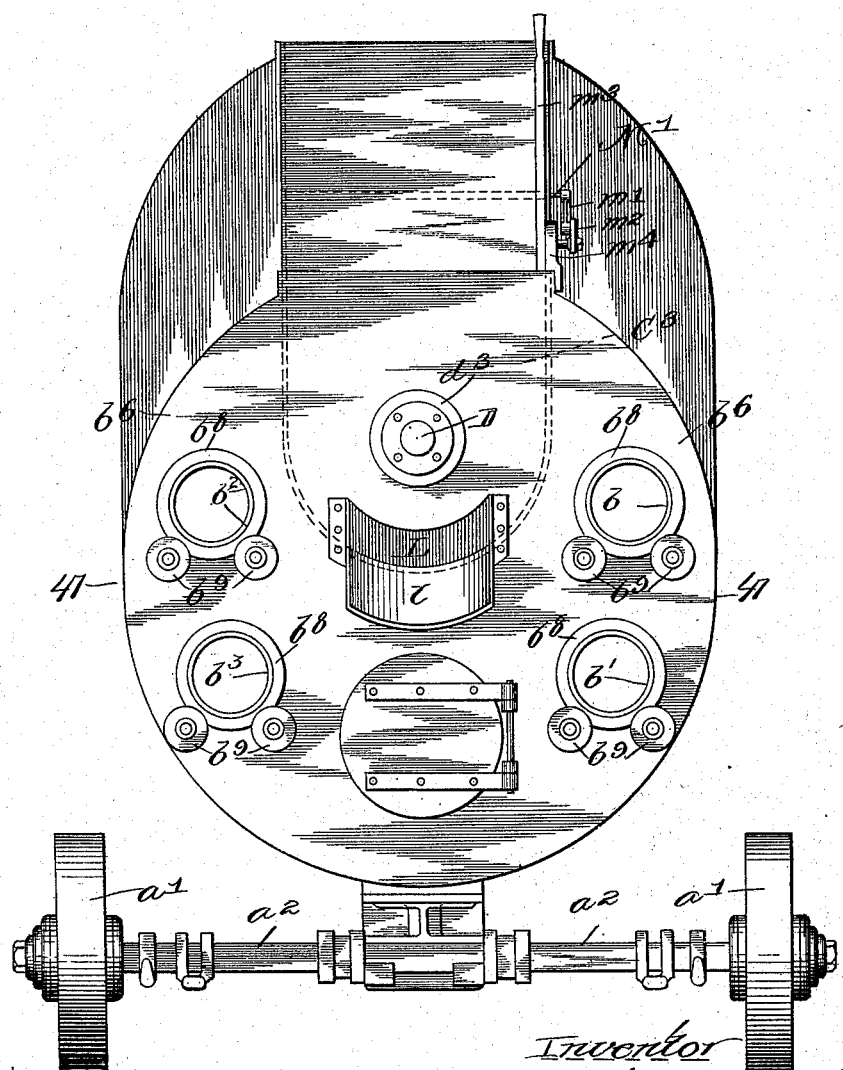

In the drawings, Figure 1 is a side elevation, partly broken, of a machine embodying my invention, showing the same adjusted for mixing asphalt. Fig. 2 is a central vertical longitudinal section of the same. Fig. 3 is a front elevation of the same, partly broken. Fig. 4 is a vertical longitudinal section taken at one side of the center. Fig. 5 is a rear elevation, partly broken. Fig. 6 is a vertical transverse section taken at the front end of the machine. Fig. 7 is a section taken on line 7 7 of Fig. 6. Fig. 8 is a vertical section taken at the rear end of the machine. Fig. 9 is a longitudinal section of the means for delivering the contents of the upper mixing-chamber into the lower. Fig. 10 is a fragmentary plan view of the same. Fig. 11 is a plan view of one of the mixing-blades. Fig. 12 is a front elevation of the same. Figs. 13 and 14 are views illustrating the means for rotatably supporting the tubular conveyers. Fig. 15 is a fragmentary plan view of the front axle. Fig. 16 is a front elevation of the same. Fig. 17 is a fragmentary vertical section of part of one of the elevators and means for measuring the ingredients. Fig. 18 is a side elevation of a paddle embodying my invention. Fig. 19 is a plan view of the same. Fig. 20 is a vertical longitudinal section similar to Fig. 2 of a modification showing the coils and the upper mixer-shaft removed. Fig. 21 is a section taken on line 21 21 of Fig. 20. Fig. 22 is a rear elevation. Fig. 23 is a section taken on line 23 23 of Fig. 20. Fig. 24 is a front elevation with parts omitted. Fig. 25 is a section taken on line 25 25 of Fig. 23. Fig. 26 is a fragmentary plan view of the dumping means for the measuring-box. Fig. 27 is a side elevation showing parts in dotted lines. Fig. 28 is a side elevation, partly broken, of another modification of the device adapted to mixing mastic. Fig. 29 is a vertical section taken on line 29 29 of Fig. 28. Fig. 30 is a similar section taken on line 30 30 of Fig. 28. Fig. 31 is a fragmentary side elevation.

As shown in the drawings, A indicates a portable steam-boiler supported on truck-wheels $a$ $a'$, the front axle $a^2$ pivotally supporting the front end of the boiler on ball-bearings or other antifriction-bearings. Said boiler is provided with a central tubular fire-box or combustion-chamber A', which extends longitudinally therethrough and is provided at the rear of the boiler with a fire-door. A smoke-box is provided at each end of the boiler, adapted to receive the gases of combustion, that at the rear end of the boiler communicating with a stack J. Said boiler is provided with a plurality of large longitudinal flues B B' B² B³. Said flues are connected with the boiler-heads at the ends of the boiler by means affording a tight joint. Within each of said flues is provided a tubular rotative conveyer $b$ $b'$ $b^2$ $b^3$, adapted to receive and convey material through the boiler. The ends of each conveyer are rotatively secured in the outer walls $b^6$ $b^7$ of the smoke-boxes. Within said conveyers cleats $b^5$, preferably of angle-iron, are provided, which extend spirally around the interior of the conveyer and are rigidly secured thereto by riveting or like means. Similar cleats $b^4$, as shown, are secured in a like manner on the outer side of each tubular conveyer. Rigidly secured on each of the protruding front ends of said conveyers is a flanged collar $b^8$, and a plurality of grooved rollers $b^9$ $b^9$ are pivoted on each of said walls $b^6$ or $b^7$ in position to engage and support the edge of said collar, as shown in Fig. 14, thereby permitting rotation of said conveyer while holding the same from longitudinal movement. Located centrally and at the rear of said boiler and extending downwardly therein is the open compartment or tank, formed of boiler-iron and relatively narrow laterally of the boiler as compared with its length. The bottom of said tank, as shown, extends below the tops of said flues B and B$^2$, so that its bottom portion is at all times submerged when the device is in use. The rear end of said tank is formed by the rear boiler-head and the front end by the outer wall $b^6$ of the smoke-box. A partition $c$ divides the tank transversely into two unequal parts or compartments, of which the shorter, C, is located at the rear and is adapted to contain liquid or fluid material to be treated and is provided, as shown, with a coil of pipe C', herein shown as double and located on each side of said compartment and to which steam under pressure is delivered through the valved pipe C$^2$, as shown in Fig. 8. A rotative shaft D extends through said compartment C, and the front compartment C$^3$ and is journaled on the front and rear ends of the boiler. Stuffing-boxes $d'$ $d^2$ $d^3$ of any preferred type are provided where said shaft passes through vertical walls. In said central front or longer compartment C$^3$ beaters $d^{14}$ $d^{15}$ are rigidly secured on said shaft D and arranged staggering and spirally thereon, with the blades thereof oblique to the axis of the shaft. Agitating-paddles $d^4$ are secured on said shaft within the compartment C on each side of the coils and act to agitate the liquid contained therein during the mixing operation. In the machine illustrated in Figs. 1 to 19, inclusive, in which the machine is shown adjusted for asphalt, a shaft D' is shown journaled near the top of the compartment C and parallel with the shaft D. Stuffing-boxes are provided on said shaft where the same passes through vertical walls of the compartments, and mixing-paddles $d^4$ are secured thereon, corresponding with the similar paddles secured on the shaft D. Said shaft extends forwardly through a relatively short mixing-chamber C$^4$, which extends above the chamber C$^3$ and is separated therefrom by means of a bottom formed of two oppositely-movable transversely-apertured floor members $d^5$ $d^6$, which in one position are adapted to form a closed bottom and when moved oppositely are adapted to form openings through which the contents of said mixing-chamber C$^4$ pass to the mixing-chamber C$^3$. Means are provided for operating said floor members, comprising a shaft $d^7$, journaled transversely on the front end of the boiler and operatively connected with the floor member $d^6$ by means of the toggle-bars $d^{12}$ $d^{13}$. A similar shaft $d^8$, parallel with the shaft $d^7$, is located above the front ends of said floor portions and in advance thereof. A lever $d^9$ is rigidly secured on said shaft $d^7$, and a bell-crank lever $d^{10}$ is secured on the shaft $d^8$, one end of which is secured on the forward end of the shifting floor member $d^5$ and the other end of which is secured to toggle-bars $d^{11}$, one of which is rigid on the shaft $d^7$, so that when said lever $d^9$ is moved, causing rotation of the shaft $d^7$, corresponding movement in the bell-crank moving the floor portion $d^5$ longitudinally, while at the same time the toggle-bars $d^{12}$ $d^{13}$ act to move the floor portion $d^6$ oppositely, so that when said lever $d^9$ is shifted to the position shown in full lines in Fig. 9 the floor portions are so situated with respect to each other as to form an approximately tight floor between the compartments; but when shifted to the position shown in dotted lines in said figure the apertures in one of said floor portions coincide with the apertures in the other. The means for operating said conveyers and said mixers and means for delivering the material thereinto will next be described.

Motors E, herein shown as upright steam-engines, are supported on the rear end of the boiler, on each side thereof, and operated by the steam generated in said boiler. Said engines are operatively connected with opposite ends of a crank-shaft E', journaled transversely at the rear end of the boiler intermediately between the protruding ends of the shafts D and D'. A worm $e$ is rigidly secured on said shaft and in engagement with complemental gears $e'$ $e^2$, rigidly secured, respectively, on the shafts D and D', and acts to rotate the same. The protruding ends of the cylindric tubular conveyers $b$ $b'$ $b^2$ $b^3$ at said rear end of the boiler are each provided with rigidly-secured gears $e^3$ $e^4$ $e^5$ $e^6$, and a shaft E$^2$ is journaled on said boiler end, with its ends extending between the conveyer-gears on each side of the boiler and provided on each end with a worm $e^7$, adapted to engage said gears of an upper or a lower conveyer, thereby rotating said conveyers. As shown, a sprocket-wheel E$^3$ is loosely mounted on the shaft E' in alinement with a sprocket-wheel E$^4$ on the shaft E$^2$, and a belt, preferably a chain, is led around said sprocket-wheels and acts to rotate the shaft E$^2$ from the shaft E'.

The sprocket-wheel $E^3$ is provided on one side with a clutch member of any preferred kind adapted to be engaged by a complemental clutch member rotative with the shaft $E'$ and movable longitudinally thereof, and a lever is pivoted on the end of the boiler and engaged on said longitudinally-movable clutch member in a familiar manner and acts to throw the same into and out of engagement with the clutch member on the wheel $E^3$. From the construction described it is obvious that the operation of the mixer is entirely independent of the operation of the tubular conveyers. Means are provided for delivering the material to said tubular conveyers, comprising hoppers G G', supported on the front end of the boiler, one on each side thereof, and having connected in their bottoms chutes $g$ $g'$, which open into the ends of the upper conveyers $b$ and $b^2$, thereby acting to deliver moist sand or other material placed in said hoppers into said conveyers. The rotation of the conveyers acts to convey said material therethrough, and at the rear end of the boiler are provided the vertical chutes $G^2$ $G^3$, the upper ends of which respectively inclose the delivery ends of the conveyers $b$ $b^2$ and the lower ends of which open into the conveyers $b'$ and $b^3$, respectively, as shown in Figs. 4 and 5.

At the front end of the boiler and at one side of the same is provided an upwardly-extending bucket elevator H, the top or delivery end of which extends above the boiler. As shown, a chain belt or sprocket-chain is trained over sprocket-wheels at the lower end and at the upper end of the elevator, and a chain-belt connection is provided leading from a pulley on the end of the shaft D to a pulley on the end of the lower sprocket-shaft, thereby enabling said elevator to be driven from the same motor or motors that operate the remainder of the machine. The chutes $h$ $h'$, into which the delivery ends of the conveyers $b'$ and $b^3$ extend, lead downwardly and communicate with the casing at the bottom of the elevator H and deliver the sand or other material received from said conveyers into position to be taken up by the buckets thereof, as shown in Figs. 3 and 6. The delivery-spout H' of said elevator opens into a covered hopper $H^2$, supported on the front end of the boiler, and is provided at its rear lower end with a delivery-pipe $h^4$, which leads downwardly and rearwardly to a point above the front end of the compartment $C^4$ and into position to deliver the dried and heated material into a measuring-bucket I. Said measuring-bucket is supported upon standards $i$, rigidly secured on the top of the boiler and to the side walls of said compartment, and a brace-bar $i'$ connects the tops of the standards on opposite sides of said compartment, as shown in Fig. 3, and a lever $I^2$ is rigidly secured to the bucket and acts to swing the same to its dumping position. A notched quadrant $i^2$ is rigidly secured on said brace-bar and is notched to afford engagement with a spring-controlled dog carried on the lever $I^2$ in a familiar manner, which acts to hold said buckets in the receiving position. A similar bucket I' is similarly pivoted in position to dump its contents into said compartment from the side opposite the bucket I. A handle $I^3$, provided with a spring-dog adapted to engage in a quadrant, is similarly employed to hold said bucket in its receiving position.

The operation of my device is as follows: When adjusted for mixing and preparing asphalt for paving or other purposes, the asphalt is placed in the compartment C, and steam from the boiler is admitted to the coils C' C' through the pipe $C^2$, thereby heating the asphalt and rendering the same fluid. Sand may be now poured into the hoppers G and G' and the engine or engines started, thereby rotating the tubular conveyers and carrying the sand therethrough. Owing to the construction described, the exterior surfaces of said tubular conveyers are exposed not only to the heat of the water in the boiler, but also to the heat of the gases of combustion which pass longitudinally thereof through the flues B B' $B^2$ $B^3$. The sand admitted to said conveyers on each side of the boiler traverses through the entire length of the boiler twice, thereby exposing the same to the heating effects for a considerable period of time, and is finally delivered to the elevator H, which conveys the same upwardly and deposits it in the bucket I, as shown in Figs. 3 and 17. Other desired ingredients may be measured into the bucket I' and dumped, together with the contents of the bucket I, into the compartment $C^4$ into position to be engaged by the blades on the shaft D', by the action of which said ingredients are thoroughly mixed. The asphalt in the compartment C being reduced to the requisite consistency by the heat of the coil and the ingredients in the compartment $C^4$ being thoroughly mixed, the fluid contents of said compartment C may be permitted to flow into the compartment $C^3$, through valved apertures K K', the closures for which are provided with handles $k$ $k'$, which extend above the top of said compartment. The lever $d^9$ may now be actuated to open the bottom of compartment $C^4$ and to permit the mixed ingredients therein to pass downwardly into the compartment $C^3$, where the same is engaged by the beaters or blades on the shaft D and by means of which said fluid material and the ingredients received from the compartment $C^4$ are thoroughly commingled and reduced to the proper consistency for use. When the material has been reduced to the requisite consistency in the compartment $C^3$, it is discharged therefrom through the gate L (shown in Figs. 2 and 3) into a spout $l$, which projects outwardly therefrom and from which the material may be carried to the place where the same is to be used.

If preferred, for the purpose of mixing concrete or like material the coils may be removed from the compartment C and the shaft D' also removed and suitable patches secured on the vertical walls of said compartments over the apertures for said shaft. When so adjusted, the compartment C may be filled or partly filled with water for moistening material in the compartment $C^3$. Preferably the compartment $C^4$ will be used as a measuring box or chamber, and for this purpose the floor, hereinbefore described, may be removed and a dumping-bottom provided therein, which, as shown in Figs. 20 to 27, is supported on a frame M', which fits closely in said compartment and comprises lateral side members $m$, on which are supported the slats M by means of pivot-pins at each end of each slat. As shown, the pivot-pins at one end of the slats extend outwardly through the frame and the side of said compartments, and a lever $m'$ is secured on each. A bar $m^2$ engages the ends of said levers, as shown in Fig. 27, and is connected with the lever $m^3$, pivoted on the boiler-top. A quadrant $m^4$ is also secured on said boiler in position to be engaged by a spring-controlled dog carried by the lever in a familiar manner and holds said slats in their closed positions. Inasmuch as it is not ordinarily desired to heat or warm the concrete while mixing the same, a lining or jacket comprising a sheet of metal N is bent to fit closely to the bottom and sides of the compartment $C^3$ and extends upwardly to approximately the top of the boiler. Lugs $n$ are secured on the inner side of the sheet, which act to hold the sheet or jacket from contact with said walls or bottom and provide an air-space between the same. Perforated pipes $N^2$ open into the tank or compartment C and extend therefrom longitudinally with the compartment $C^3$ and spray water upon the contents of said compartment during the mixing operation. Obviously when adjusted for this purpose it may not be necessary to heat or dry the material, and for this purpose the tubular conveyers need not be used, and this machine may therefore be lightened by removing all spouting and tubing therefrom and the elevator H, hereinbefore described.

In the figures illustrated in Figs. 28, 29, and 30 the device is adjusted for a mastic-mixer. In this instance the machine, adjusted as described for mixing concrete, is provided, as shown, with a longitudinal screw conveyer O, supported above the boiler. Said conveyer is surrounded with a steam-jacket $o$, to which steam is supplied from the boiler through suitable pipes (not shown) and which heats the material as it is moved by the conveyer. A hopper $o'$ is provided on the front end of said conveyer adapted to receive the material for the composition. Said conveyer is driven from the shaft D, on the front end of which is provided a sprocket-wheel in alinement with a corresponding sprocket-wheel on the end of the conveyer-shaft and about which extends a chain belt of any desired construction. The material which passes through said conveyer passes through a chute O' into the compartment $C^3$, where other ingredients may be added from the compartment C and the mastic thoroughly mixed by the beaters on the shaft D. When the mixing operation is complete, the material may be permitted to pass outwardly at the front end of the machine either through the gate, hereinbefore described, or through a valve P of any desired construction into the receptacle in which it is to be conveyed to the place of use.

Obviously the device may be made of any size and proportion and any desired motors may be used to actuate the same and many features of construction may be modified without departing from the principle of my invention.

I claim as my invention—

1. The combination with a steam-boiler provided with a suitable furnace, of conveyers passing therethrough, means for heating the contents of said conveyers from the gases of combustion, a mixing-chamber situated partly in said boiler and a chain and bucket elevator communicating between the mixing-chamber and the conveyer.

2. The combination with a steam-boiler provided with a suitable furnace, of conveyers passing therethrough, means for heating the contents of said conveyers from the gases of combustion, a mixing-chamber located partly within the boiler and means operated by the steam generated in said boiler acting to operate the conveyer and deliver the material therefrom into the mixing-chamber.

3. The combination with a steam-boiler of flues passing therethrough, conveyers extending through said flues, a plurality of compartments located partly within the boiler and adapted to contain ingredients to be operated upon, means in said compartment for mixing the ingredients and means carried on the boiler for operating said conveyers and mixing means.

4. The combination with a steam-boiler of flues passing therethrough, conveyers extending through said flues, a plurality of compartments located partly within the boiler and adapted to contain ingredients to be operated upon and means in one of said compartments for mixing the ingredients, and means operated from steam generated by the boiler for operating said conveyers and mixing means.

5. The combination with a steam-boiler, of a flue extending longitudinally thereof, a tubular rotative conveyer located longitudinally within said flue and adapted to convey material therethrough, compartments with agitator-shafts therein partly contained in said boiler and means for rotating said conveyer and shafts.

6. The combination with a steam-boiler of a fire-flue extending longitudinally thereof, a tubular rotative conveyer located longitudinally within said flue and adapted to convey material therethrough, a mixing-compartment, a heating-compartment containing coiler steam-pipes and communicating with the mixing-compartment and means for rotating said conveyer.

7. The combination with a boiler, of a plurality of longitudinal fire-flues extending therethrough, a tubular conveyer located longitudinally in each flue, means for delivering material to said conveyers, means for rotating said conveyers and means whereby material conveyed through the boiler in one of said conveyers is returned therethrough by another conveyer, a mixing-compartment contained in said boiler, a dumping-floor therein and means for operating said floor.

8. The combination with a steam-boiler of a tubular combustion-chamber therein extending longitudinally thereof, a plurality of upper and lower fire-flues of relatively large size extending longitudinally through the boiler, a tubular conveyer located longitudinally in each fire-flue, means for rotating the upper and lower conveyers and means whereby material conveyed through an upper conveyer is returned through a lower, means operated by steam generated in said boiler for actuating said conveyers and an elevator adapted to receive the material from said conveyers.

9. The combination with a steam-boiler of a mixing-chamber, a tubular combustion-chamber extending longitudinally through the boiler, a plurality of upper and lower fire-flues of relatively large size extending longitudinally through the boiler, a tubular conveyer located longitudinally in each fire-flue, means for rotating the upper and lower conveyers and means whereby material conveyed through an upper conveyer is returned through a lower, means operated by steam generated in said boiler for actuating said conveyers and an elevator adapted to receive the material from said conveyers and deliver the same into the mixing-chambers.

10. The combination with a steam-boiler, of tubular rotative conveyers extending longitudinally therethrough and arranged in pairs one above the other, means for delivering material thereinto at one end thereof, means for conducting the material from the upper conveyers to the lower thereby returning the same through the boiler to a point of discharge, an upwardly-opening heating-compartment contained in said boiler and a steam-engine mounted on the boiler acting to operate said conveyers.

11. The combination with a steam-boiler of a tubular combustion-chamber extending longitudinally therethrough, a plurality of relatively large fire-flues acting to convey the gases of combustion through said boiler longitudinally thereof, rotative tubular conveyers extending concentrically of said fire-flues with the ends thereof projecting beyond the same and means secured on said projecting ends adapted to cause rotation thereof.

12. The combination with a steam-boiler having a tubular combustion-chamber extending longitudinally therethrough, a plurality of relatively large fire-flues extending longitudinally through the boiler, rotative tubular conveyers extending concentrically of said flues with the ends thereof projecting beyond the same and means secured on said projecting ends adapted to cause rotation thereof and an upwardly-opening compartment adapted to have its bottom portion submerged in said boiler and means for delivering material from the conveyers into said compartment.

13. The combination with a boiler of longitudinally-extending fire-flues extending therethrough, longitudinally-disposed tubular conveyers therein, means for rotating said conveyers, means for delivering material thereto and a compartment formed in the top of said boiler and extending downwardly therein and a steam-coil leading from said boiler into said compartment.

14. The combination with a steam-boiler of tubular rotative conveyers extending longitudinally therethrough and arranged in pairs one above the other, means for delivering material thereinto at one end thereof and for conducting the material from the upper conveyer to the lower and therethrough to a point of discharge and a steam-engine mounted on said boiler and an upwardly-opening chamber having its bottom portion submerged in said boiler and divided into a plurality of compartments and means for delivering material from the conveyers to one of the said compartments.

15. The combination with a steam-boiler of tubular rotative conveyers extending longitudinally therethrough and arranged in pairs one above the other, means for delivering material thereinto at one end thereof and for conducting the material from the upper conveyers through the lower to a point of discharge, a steam-engine mounted on said boiler, a plurality of upwardly-opening compartments having their bottom portions submerged in said boiler, mixing means operated by said engine in one of said compartments and an elevator acting to deliver material to said mixing means from the conveyers.

16. The combination with a steam-boiler provided with a suitable furnace, of fire-flues extending therethrough, material-conveyers incased in said flues and connecting conveyers acting to pass material from one to the other of said material-conveyers.

17. The combination with a steam-boiler, of a combustion-chamber and a plurality of connected fire-flues adapted to be covered by the water in said boiler, a plurality of tubular material-conveyers rotatively engaged in said flues and spiral flanges on the outer surface of said conveyers adapted to circulate the gases of combustion.

18. The combination with a steam-boiler provided with a suitable furnace of a plurality of longitudinally-disposed material-conveyers and heaters arranged in pairs near each side of said boiler in position to be exposed to the heat of said boiler and the gases of combustion, the conveyers of each pair communicating at one end and acting to conduct material twice along said boiler and to a point of delivery, an upwardly-opening chamber in the top of said boiler divided into a heating-compartment containing a steam-coil and a mixing-compartment containing mixing mechanism, valves between said compartments and means for delivering material from the conveyers into the mixing-chamber and means for operating the mixing mechanism and conveyers.

19. The combination with a steam-boiler of a downwardly-extending chamber in the top thereof, a valved partition dividing said chamber into a heating-compartment and a mixing-compartment, supplemental heating means in said heating-compartment, mixing means in the mixing-compartment and an engine carried on said boiler and acting to operate said mixing means.

20. The combination with a steam-boiler, of a chamber disposed in the top thereof and adapted to be partly submerged therein, a valved partition dividing said chamber into a heating-compartment and a mixing-compartment, supplemental heating means in said heating-compartment, mixing means in the mixing-compartment comprising a rotative shaft with radial blades or beaters thereon and an engine carried on said boiler and acting to operate the mixing means.

21. The combination with a steam-boiler of a longitudinally-disposed upwardly-opening chamber in the top thereof and adapted to be partly submerged therein, a transverse valved partition dividing said chamber into a heating-compartment containing a steam-coil which communicates with the boiler and a mixing-compartment and mixing means therein.

22. The combination with a steam-boiler of a longitudinally-disposed upwardly-opening chamber in the top thereof and adapted to be partly submerged therein, a transverse valved partition dividing said chamber into a heating-compartment containing a steam-coil which communicates with the boiler and a mixing-compartment and mixing means therein comprising radial obliquely-set beaters rigidly secured on a shaft extending through said chamber.

23. The combination with a steam-boiler of a longitudinally-disposed upwardly-opening chamber in the top thereof and partly submerged therein, a transverse valved partition dividing said chamber into a heating-compartment containing a steam-coil which communicates with the boiler and a mixing-compartment and mixing means therein comprising radial obliquely-set beaters rigidly secured on a shaft extending through said chamber and means for drying and heating one of the ingredients to be operated upon and means for delivering the same into said mixing-compartment.

24. The combination with a steam-boiler of a longitudinally-disposed upwardly-opening chamber in the top thereof and adapted to be partly submerged therein, a transverse valved partition dividing said chamber into a heating-compartment containing a steam-coil which communicates with the boiler and a mixing-compartment and mixing means therein comprising radial obliquely-set beaters rigidly secured on a shaft extending through said chamber and means for drying and heating one of the ingredients to be operated upon and means for delivering the same into said mixing-compartment including a measuring device mounted on the boiler and adapted to control the delivery of said material.

25. The combination with a boiler of a longitudinally-disposed upwardly-opening chamber extending downwardly submerged in the top thereof, a transverse valved partition dividing said chamber into a heating and a mixing compartment said mixing-compartment being also divided horizontally to provide an upper compartment, mixing mechanism in the mixing-compartment and means operated by an engine carried on said boiler for driving said mixing mechanism.

26. The combination with a boiler of a longitudinally-disposed upwardly-opening chamber submerged in the top thereof, a transverse valved partition dividing said chamber into a heating-compartment containing a steam-coil and a mixing-compartment said mixing-compartment being also divided horizontally by means of a valved floor to provide an upper measuring-compartment, mixing mechanism in the measuring-compartment and in the mixing-compartment and means operated by an engine carried on said boiler for driving said mixing mechanism.

27. The combination with a portable fire-flue steam-boiler of a submerged chamber extending longitudinally thereof and opening upwardly above the boiler, means operated by an engine carried on said boiler for conveying one of the materials to be treated through the fire-flues and means for elevating the material thus treated and delivering same into said submerged chamber.

28. The combination with a portable fire-flue steam-boiler of a submerged chamber extending longitudinally thereof and opening upwardly above the boiler, means operated by an engine carried on said boiler for conveying one of the materials to be treated through the fire-flues and means for elevating the material thus treated and delivering same into said submerged chamber and measuring means supported on the boiler and acting to control said delivery of material into said chamber.

29. The combination with a boiler of means for conveying material to be operated upon a plurality of times therethrough and acting to heat and dry the same, submerged upwardly-opening compartments, one of which forms a heating-compartment, another a mixing-compartment in the top of said boiler, supplemental heating means in the heating-compartment, a horizontal shaft extending through both compartments, means for rotating said shaft and beaters on said shaft in the heating-compartment and mixing-blades thereon in the mixing-compartment, means for delivering the heated and dried material to the mixing-compartment and a valve adapted to be opened to permit material from the heating-compartment to flow thereto.

30. The combination with a boiler of means for conveying material to be operated upon a plurality of times therethrough and acting to heat and dry the same, submerged upwardly-opening compartments, one of which forms a heating-compartment, another a mixing-compartment in the top of said boiler, supplemental heating means in the heating-compartment, a plurality of parallel horizontal shafts extending through both compartments, means for rotating said shafts and beaters on said shafts in the heating-compartment and oblique mixing-blades thereon in the mixing-compartment, means for delivering the heated and dried material to the mixing-compartment and a valve adapted to be opened to permit material from the heating-compartment to flow thereto.

31. The combination with a boiler of longitudinally-disposed upwardly-opening compartments submerged in the top thereof, longitudinal parallel shafts extending through said compartments, a gear on each shaft, a worm located between and engaging each of said gears and driven from an engine carried on said boiler.

32. The combination with a steam-boiler mounted on wheels or the like of tubular conveyers extending longitudinally through said boiler and adapted to convey material a plurality of times therethrough, upwardly-opening longitudinally-disposed compartments submerged in the top of said boiler and adapted to receive the material to be treated, a plurality of parallel shafts provided with beaters extending through said compartments, driving means operated from an engine carried on said boiler and acting to rotate the shafts and means also operated from said engine acting to rotate said conveyers.

33. The combination with a steam-boiler mounted on wheels or the like of conveyers adapted to convey material a plurality of times therethrough, longitudinally-disposed compartments submerged in the top of said boiler and adapted to receive the material to be treated, a plurality of parallel shafts extending through said compartments, beaters thereon, driving means located between said shafts and operated from an engine carried on said boiler and acting to rotate the shafts, means also operated from said engine for operating said conveyers.

34. The combination with a steam-boiler mounted on wheels or the like of conveyers extending longitudinally of and heated from the boiler, longitudinally-disposed compartments partly submerged in the boiler and comprising a heating and a mixing chamber, a shaft extending through said compartments, a gear on the outer end of the same, a shaft journaled on said boiler, a worm thereon engaging said gear, a like shaft journaled parallel therewith and provided at its ends with means to operate said conveyers, means permitting one of said shafts to be stopped independently of the other.

35. The combination with a boiler mounted on wheels or the like of a plurality of mixing-compartments located one above the other and adjacent to a heating-compartment all partly submerged within said boiler, parallel shafts extending through said compartments, radial blades on said shafts in the heating-compartments and obliquely-set beaters thereon in the mixing-compartments.

36. The combination with a boiler mounted on wheels or the like of a plurality of mixing-compartments located one above the other and adjacent to a heating-compartment all partly submerged within said boiler, parallel shafts extending through said compartments, obliquely-set beaters thereon in the mixing-compartments, a coil in the heating-compartment and agitator-blades rigidly secured on said shafts on each side of said coil and means operated by an engine carried on said boiler for rotating said shafts and forcing the material operated on longitudinally of said mixing-compartments.

37. In a device of the class described, an upper and a lower mixing-compartment each partly submerged in a steam-boiler a horizontal movable partition between said compartments and adapted when adjusted in one position to form a comparatively tight bottom and when adjusted in the other position to permit the contents to fall from the upper compartment into the lower.

38. The combination with a boiler, of a plurality of submerged compartments therein, of means for jacketing the interior of one of said compartments and acting to exclude the heat therefrom.

39. The combination with a steam-boiler of a longitudinally-disposed upwardly-opening chamber submerged therein and forming part thereof, said chamber divided into a plurality of compartments and means for jacketing or lining the interior of one of said compartments acting to exclude the heat therefrom and means for conducting fluid from one of said compartments into the other.

40. The combination with a steam-boiler of a mixing-compartment submerged therein, mixing mechanism therein, a material-conveyer carried on said boiler and delivering into the mixing-compartment, a jacket surrounding said conveyer and means for admitting heated fluid into the jacket.

41. In a machine of the class described, the combination with a boiler and its fire-flues, of a conveyer in one or more of said flues comprising a rotatable tube, spiral webs therein, means for rotating the conveyers and connecting conveyers acting to pass material from one to the other of said tubular conveyers.

42. In a device of the class described the combination with a steam-boiler, of an upwardly-opening mixing-chamber in the top thereof, a conveyer supported on the boiler and adapted to deliver material into the mixing-chamber, and a steam-jacket adapted to receive steam from the boiler inclosing the said conveyer.

In testimony whereof I have hereunto subscribed my name in the presence of two subscribing witnesses.

GUSTAV A. SCHILLINGER.

Witnesses:
C. W. HILLS,
LOUIS J. DELSON.